US012705247B2

(12) United States Patent
Marino et al.

(10) Patent No.: US 12,705,247 B2
(45) Date of Patent: Aug. 11, 2026

(54) RESOURCE NAVIGATION USING NEURAL NETWORKS

(71) Applicant: GDM Holding LLC, Mountain View, CA (US)

(72) Inventors: Kenneth Daniel Marino, Draper, UT (US); Manzil Zaheer, West New York, NJ (US); Robert David Fergus, New York, NY (US); Will S. Grathwohl, New York, NY (US)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/867,108

(22) PCT Filed: May 19, 2023

(86) PCT No.: PCT/EP2023/063486
§ 371 (c)(1),
(2) Date: Nov. 19, 2024

(87) PCT Pub. No.: WO2023/222882
PCT Pub. Date: Nov. 23, 2023

(65) Prior Publication Data

US 2025/0363121 A1 Nov. 27, 2025

Related U.S. Application Data

(60) Provisional application No. 63/343,964, filed on May 19, 2022.

(51) Int. Cl.

*G06F 16/2457* (2019.01)
*G06F 16/951* (2019.01)
*G06F 16/953* (2019.01)

(52) U.S. Cl.
CPC ...... *G06F 16/24578* (2019.01); *G06F 16/951* (2019.01); *G06F 16/953* (2019.01)

(58) Field of Classification Search
CPC ............. G06F 16/9535; G06F 16/9024; G06F 16/24578; G06F 16/951; G06F 16/953; G06F 16/3344; Y02D 10/00; G06N 3/088; G06N 3/0895; G06N 3/044; G06N 3/0455
See application file for complete search history.

(56) References Cited

U.S. PATENT DOCUMENTS

2015/0161276 A1* 6/2015 Upstill .................. G06F 16/951 707/708
2019/0114362 A1 4/2019 Subbian et al.
2020/0117691 A1* 4/2020 Sun ....................... G06F 16/951
2020/0175046 A1 6/2020 Wang et al.
2021/0150155 A1 5/2021 Kim et al.

(Continued)

OTHER PUBLICATIONS

Chen et al., "Reading Wikipedia to Answer Open-Domain Questions," CoRR, Submitted on Mar. 31, 2017, arXiv:1704.00051, 10 pages.

(Continued)

*Primary Examiner* — Apu M Mofiz
*Assistant Examiner* — Oscar Wehovz
(74) *Attorney, Agent, or Firm* — Fish & Richardson P.C.

(57) ABSTRACT

Methods, systems, and apparatus, including computer programs encoded on computer storage media, for resource navigation using neural networks.

22 Claims, 4 Drawing Sheets

(56) References Cited

U.S. PATENT DOCUMENTS

2022/0207094 A1* 6/2022 Dormidontov ..... G06F 16/9538
2024/0232580 A1* 7/2024 Jaegle .................... G06N 3/084

OTHER PUBLICATIONS

CodaLab [online], "Fact Extraction and VERification (FEVER) Challenge," Retrieved on Jan. 10, 2025, Retrieved from URL <https://competitions.codalab.org/competitions/18814#results>, 4 pages.
Das et al., " Go for a walk and arrive at the answer: Reasoning over paths in knowledge bases using reinforcement learning," CoRR, Submitted on Nov. 15, 2017, arXiv:1711.05851v2, 18 pages.
Fu et al., "Collaborative policy learning for open knowledge graph reasoning," CoRR, Aug. 31, 2019, arXiv:1909.00230, 15 pages.
He et al., "Neurally-Guided Semantic Navigation in Knowledge Graph," IEEE Transactions on Big Data, 2022, 8(3):607-615.
International Preliminary Report on Patentability in International Appln. No. PCT/EP2023/063486, dated Nov. 7, 2024, 13 pages.
International Search Report and Wirtten Opinion in International Appln. No. PCT/EP2023/063486, dated Jul. 27, 2023, 18 pages.
Karpukhin et al., "Dense Passage Retrieval for Open-Domain Questions Answering," CoRR, Submitted on Apr. 10, 2020, arXiv:2004.04906, 13 pages.
Kingma et al., "Adam: A Method for Stochastic Optimization," CoRR, Submitted on Dec. 22, 2014, arXiv:1412.6980, 15 pages.
Lazaridou et al., "Internet-augmented language models through few-shot prompting for open-domain question answering," CoRR, Submitted on Mar. 10, 2022, arXiv:2203.05115v2, 20 pages.
Lin et al., "Multi-hop knowledge graph reasoning with reward shaping," CoRR, Submitted on Aug. 31, 2018, arXiv:1808.10568, 12 pages.
Liu et al., "ROBERTa: A Robustly optimized BERT Pretraining Approach," CoRR, Submitted on Jul. 26, 2019, arXiv:1907.11692, 13 pages.
Nakano et al., "WebGPT: Browser-assisted question-answering with human feedback," CoRR, Submitted on Dec. 17, 2021, arXiv:2112.09332, 32 pages.
Nogueira et al., "End-to-End Goal-Driven Web Navigation," CoRR, Submitted on Feb. 6, 2016, arXiv:1602.02261, 9 pages.
Qu et al., "RocketQA: An optimized Training Approach to Dense Passage Retrieval for open-Domain Question Answering," CoRR, Submitted on Oct. 16, 2020, arXiv:2010.08191, 13 pages.
Robertson et al., "The Probabilistic Relevance Framework: BM25 and Beyond," Foundations and Trends in Information Retrieval, 3(4):333-389.
Sanh et al., "DistilBERT, a distilled version of BERT: smaller, faster, cheaper and lighter," CoRR, Submitted on Oct. 2, 2019, arXiv:1910.01108, 5 pages.
Semnani et al., "Revisiting the Open-Domain Question Answering Pipeline," CoRR, Submitted on Sep. 2, 2020, arXiv:2009.00914, 5 pages.
Shen et al., "M-Walk: Learning to Walk Over Graphs Using Monte Carlo Tree Search," CoRR, Submitted on Feb. 12, 2018, arXiv:1802.04394, 17 pages.
Stammbach et al., "Team DOMLIN: Exploiting Evidence Enhancement for the FEVER Shared Task," Paper, Presented at the Proceedings of the Second Workshop on Fact Extraction and VERification (FEVER), Nov. 3, 2019, 5 pages.
Stammbach, "Evidence Selection as a Token-Level Prediction Task," Paper, Presented at Proceedings of the Fourth Workshop on Fact Extraction and VERification (FEVER) at EMNLP, Nov. 10, 2021, 8 pages.
Talmor et al., "The Web as a Knowledge-base for Answering Complex Questions," CoRR, Submitted on Mar. 18, 2018, arXiv:1803.06643, 14 pages.
Thorne et al., "FEVER: a large-scale dataset for Fact Extraction and VERification," CoRR, Submitted on Mar. 14, 2016, arXiv:1803.05355, 20 pages.
Turc et al., "Well-Read Students Learn Better: On the Importance of Pre-Training Compact Models," CoRR, Submitted on Aug. 23, 2019, arXiv:1908.08962, 13 pages.
Wang et al., "WikiGraphs: A Wikipedia Text—Knowledge Graph Paired Dataset," CoRR, Submitted on Jul. 20, 2021, arXiv:2107.09556, 16 pages.
West et al., "Automatic Versus Human Navigation in Information Networks," Association for the Advancement of Artificial Intelligence, 2012, 8 pages.
West et al., "Human Wayfinding in Information Networks," Paper, International World Wide Web Conference Committee (IW3C2), Apr. 16-20, 2012, 10 pages.
West et al., "Wikispeedia: An Online Game for Inferring Semantic Distances Between Concepts," Paper, Presented at the Proceedings of the Twenty-First International Joint Conference on Artificial Intelligence, 2009, 6 pages.
Xiong et al., "DeepPath: A Reinforcement Learning Method for Knowledge Graph Reasoning," CoRR, Submitted on Jul. 20, 2017, arXiv:1707.06690, 10 pages.
Zaheer et al., "Big Bird: Transformer for Longe Sequences," CoRR, Submitted on Jul. 28, 2020, arXiv:2007.14062, 42 pages.

* cited by examiner

400

RESOURCE NAVIGATION USING NEURAL NETWORKS

CROSS-REFERENCE TO RELATED APPLICATION

This application is a National Stage Application under 35 U.S.C. § 371 and claims the benefit of International Application No. PCT/EP2023/063486, filed May 19, 2023, which claims priority to U.S. Provisional Application No. 63/343,964, filed on May 19, 2022. The disclosure of the prior application is considered part of and is incorporated by reference in the disclosure of this application.

BACKGROUND

This specification relates to performing information retrieval using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs an information retrieval task to retrieve information within a collection of resources in response to a received query.

Implementations of the system address the problem of efficiently searching a graph data storage structure for a target in response to a query. The graph is defined by nodes that hold information, and links between the nodes that define relationships between the nodes. Implementations of the system are able to identify the target by efficiently traversing a path through the nodes via the links, to identify a particular information storage location.

The described techniques may be used to search for any type of information; they are not dependent on the kind of data. The target may be a soft or approximate target. No human intervention is needed during the search process.

As one example, the system can retrieve information from a collection of one or more web sites, with each resource representing a web page in the one or more web sites or a portion of a web page in the one or more web sites. In this context, efficiently traversing a path through the nodes results in a reduced communications bandwidth (because fewer web pages need be retrieved), and fast, i.e. low-latency search.

Particular embodiments of the subject matter described in this specification can be implemented so as to realize one or more of the following additional advantages.

Implementations of the described techniques provide technical advantages of lower memory and compute requirements when searching a graph storage structure. This is achieved by using a navigation policy neural network to process, inter alia, an embedding of the information at a node, to generate scores for outgoing links from the node, that are then used select one of the links to follow.

By using neural networks to generate responses to queries by navigating through a collection of resources, the described techniques can generate effective responses to a variety of queries even in circumstances where traditional information retrieval techniques fail. For example, the described techniques can generate effective responses to queries by searching a collection of resources that may not be able to be effectively searched by an Internet search engine. For example, the collection of resources may be one or more fire-walled web sites that are inaccessible to the Internet search engine. As another example, the collection of resources may be one or more web sites that have not been indexed by the Internet search engine (and, therefore, the Internet search engine cannot generate results identifying pages from the un-indexed web sites). As another example, the collection of resources may be one or more web sites that are frequently updated and that therefore have significantly different from content from when they were last crawled by the Internet search engine. As another example, the described techniques can be used to complement an Internet search engine or other information retrieval system, e.g., by using an information retrieval system to find the correct vicinity of the collection relative to a query and then using the described techniques to find the desired target starting from the current resource identified by the information retrieval system.

In general implementations of the described system can process resources comprising unstructured data, e.g. text in a natural language. Implementations of the system can operate effectively even when the graph schema varies over time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
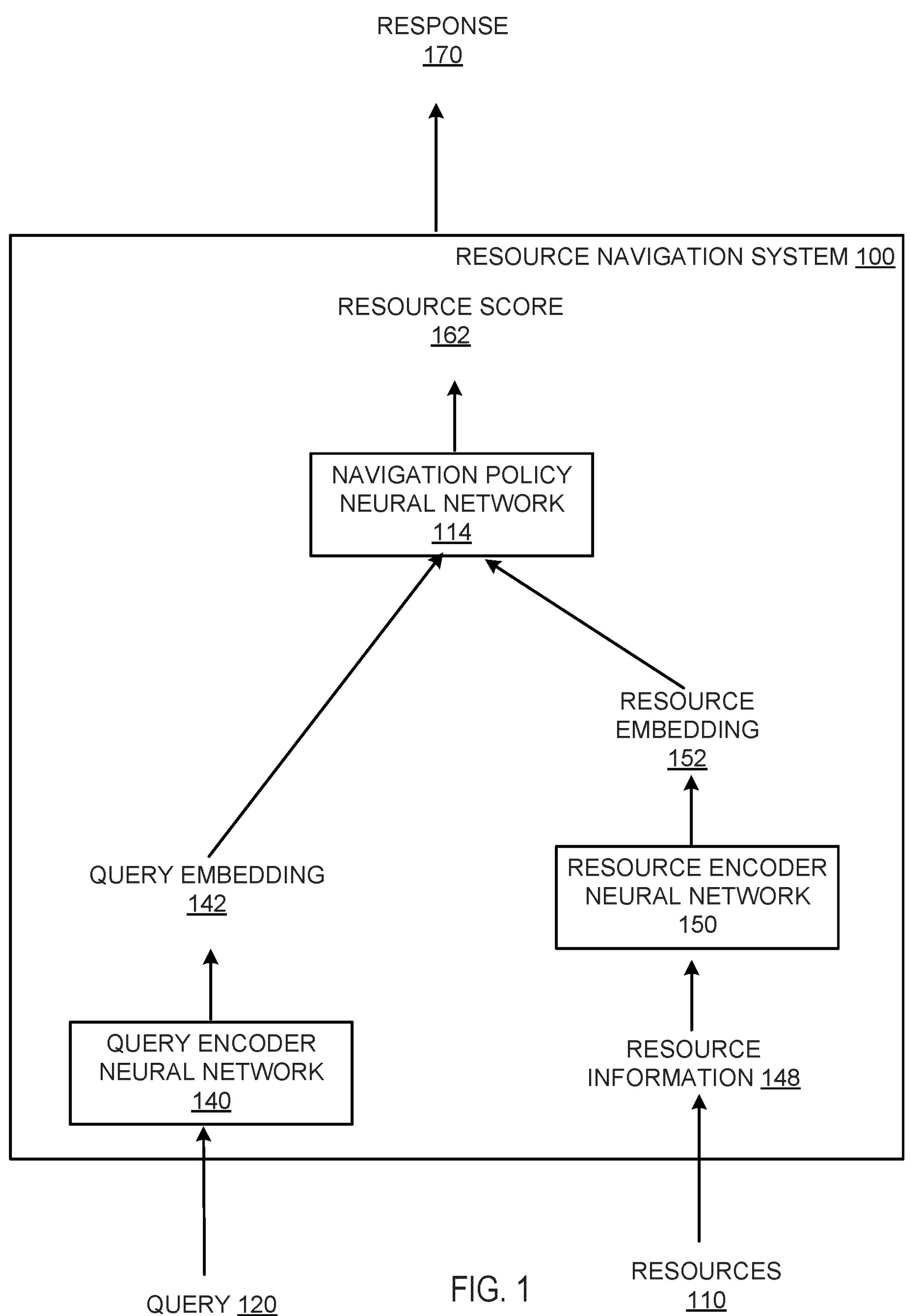
FIG. 1 shows an example resource navigation system.

FIG. 1 shows an example resource navigation system 100.

The resource navigation system 100 is an example of a system implemented as computer programs on one or more computers in one or more locations, in which the systems, components, and techniques described below can be implemented.

The resource navigation system 100 performs information retrieval tasks that require retrieving information within a collection of resources 110 in response to a received query 120.

For example, the information retrieval task can be fact verification and the query can represent a fact that needs to be verified. Then the target may indicate verification of the fact.

As another example, the information retrieval task can be question answering and the query can represent a question that requires a response. Then the target may be a response to the question.

As yet another example, the information retrieval task can be a general information retrieval task and the system can generate, as a response, one or more search results that each identify a respective resource from the collection 110. More specifically, each search result identifies the resource, includes a link to the resource, and, optionally, includes a snippet of content from the resource. Then the target may be defined as information, i.e. a result, that is a relevant response to the search.

In general the collection of resources 110 may comprise any resources that can be represented by a graph, where a resource is associated with a node of the graph and the nodes, i.e. resources, are connected by links that each point from one resource at one node to another resource at another node. Each of the resources has associated content that may comprise any type of data including, but not limited to: text data e.g. for natural language text; image or video data e.g. defining pixels of one or more images or videos; audio data e.g. defining waveforms for one or more sounds such as speech or music; or any other type of entity or knowledge.

For example, the collection of resources 110 can represent one or more web sites and each resource can represent a web page in the one or more web sites or a portion of a web page in the one or more web sites.

In particular, the system 100 receives a query 120, e.g., from a client device. For example, the query can be a natural language query.

In some cases, the collection of resources 110 to be searched by the system 100 is fixed, i.e., the system 100 searches the same collection of resources 120 for each query 110.

In some other cases, the collection of resources 110 can be specified along with the query 120. For example, the system 100 can also receive a URL or other resource locator that identifies the collection of resources 110 to be searched in response to the query 120.

As a particular example, the query 120 can be submitted through an Internet search engine.

In this example, the one or more web sites represented by the collection 110 can be web site(s) that have not been indexed by the Internet search engine and therefore cannot be searched by the Internet search engine.

As another example, content of one or more of the web pages in the one or more web sites may have changed since the one or more web sites have been indexed by the Internet search engine, i.e., so that searching the web sites using the Internet search engine can potentially result in outdating or incorrect information being retrieved.

As yet another example, the one or more web sites represented by the collection 110 can be fire-walled or otherwise inaccessible to a search engine crawler of the Internet search engine. Therefore, the one or more web sites cannot be effectively searched by the Internet search engine. Please note that this system cannot be used for providing unauthorized access to or use of content from resources that are behind any access control mechanism (e.g., fire-wall), e.g., authorized access to the resources that are being the access control mechanism is still required to determine the content of the resources and to identify links between resources. Thus, access to these resources and use of any content obtained thereby is intended to be strictly within legal and ethical boundaries.

The system 100 then retrieves information from the collection of resources 110 in response to the query 120 using a query encoder neural network 140, a resource encoder neural network 150, and a navigation policy neural network 160.

The query encoder neural network 140 is a neural network that is configured to process a query 120 to generate an embedding of the query (a "query embedding") 142. For example, the query encoder neural network 140 can be a text encoder neural network, e.g., a Transformer or a recurrent neural network. As a particular example, the query encoder neural network 140 can include a self-attention neural network that is configured to process text tokens from the query to generate a respective token embedding of each of the text tokens. The query encoder neural network 140 can then generate the query embedding 142 by combining, e.g., taking the mean or applying a different pooling operation, the token embeddings and then optionally applying a non-linear activation function, e.g., the tanh function, to the combined embedding.

As used in this specification, an "embedding" is an ordered collection of numeric values having a pre-determined dimensionality. For example, an embedding can be a vector of numeric values, e.g., floating point values or other numeric values, having a fixed number of dimensions.

The resource encoder neural network 150 is a neural network that is configured to process information 148 characterizing a resource to generate an embedding of the resource ("resource embedding") 152.

As a particular example, the resource encoder neural network 150 can be a text encoder neural network, e.g., a Transformer or a recurrent neural network, that processes the text from the current resource (and optionally the title of the resource) to generate the resource embedding 152. As a particular example, the resource encoder neural network 150 can include a self-attention neural network (a neural network with one or more self-attention layers) that is configured to process text tokens from the resource to generate a respective token embedding of each of the text tokens. In general a self-attention layer is configured to apply an attention mechanism over an attention layer input to generate an attention layer output for each element of the input; there are many possible attention mechanisms. The resource encoder neural network 150 can then generate the resource embedding 152 by combining, e.g., taking the mean or applying a different pooling operation, the token embeddings and then optionally applying a non-linear activation function, e.g., the tanh function, to the combined embedding.

As another example, the resource encoder neural network 150 can be a multi-modal encoder, e.g., a multi-modal Transformer or other multi-modal representation generation neural network, that processes both the text and the images from the resource (and optionally the title of the resource) to generate the resource embedding 152.

The navigation policy neural network 160 is a neural network that is configured to receive an input that includes at least a resource embedding 152 of a current resource, an embedding of a candidate resource linked to from the current resource, and a query embedding 142, and to generate, as output, a score 162 for the candidate resource. As an example, the navigation policy neural network 160 may comprise a feedforward neural network.

The score for a candidate resource generally represents the likelihood that navigating from the current resource to the candidate resource will result in successfully completing the information retrieval task given the query embedding 120.

The navigation policy neural network 160 will be described in more detail below with reference to FIGS. 2 and 3.

More specifically, the system 100 uses the query encoder neural network 140, the resource encoder neural network 150, and the navigation policy neural network 160 to navigate to a final resource within the collection of resources 110 and then generates a response 170 that characterizes the final resource.

Navigating through the collection of resources 110 using the neural networks is described below with reference to FIGS. 2-4.

The system 100 can then, e.g., provide the response 170 to the client device from which the query 120 was received.

In some implementations, the response 170 characterizes only the final resource, i.e., and not other current resources for preceding navigation iterations.

The format of the response 170 will generally depend on the information retrieval task being performed by the system 100.

For example, when the query 120 represents a fact, the response can include content extracted from the final resource that the system 100 has determined verifies the fact.

As another example, when the query 120 represents a question, the response 170 can include content extracted from the final resource that the system 100 has determined answers the question.

As another example, for a general search engine querying task, the system 100 can generate a search result that identifies the resource, includes a link to the resource, and, optionally, includes a snippet of content from the resource and provide the search result as part of the response 170 to the query 120.

Figure 2:
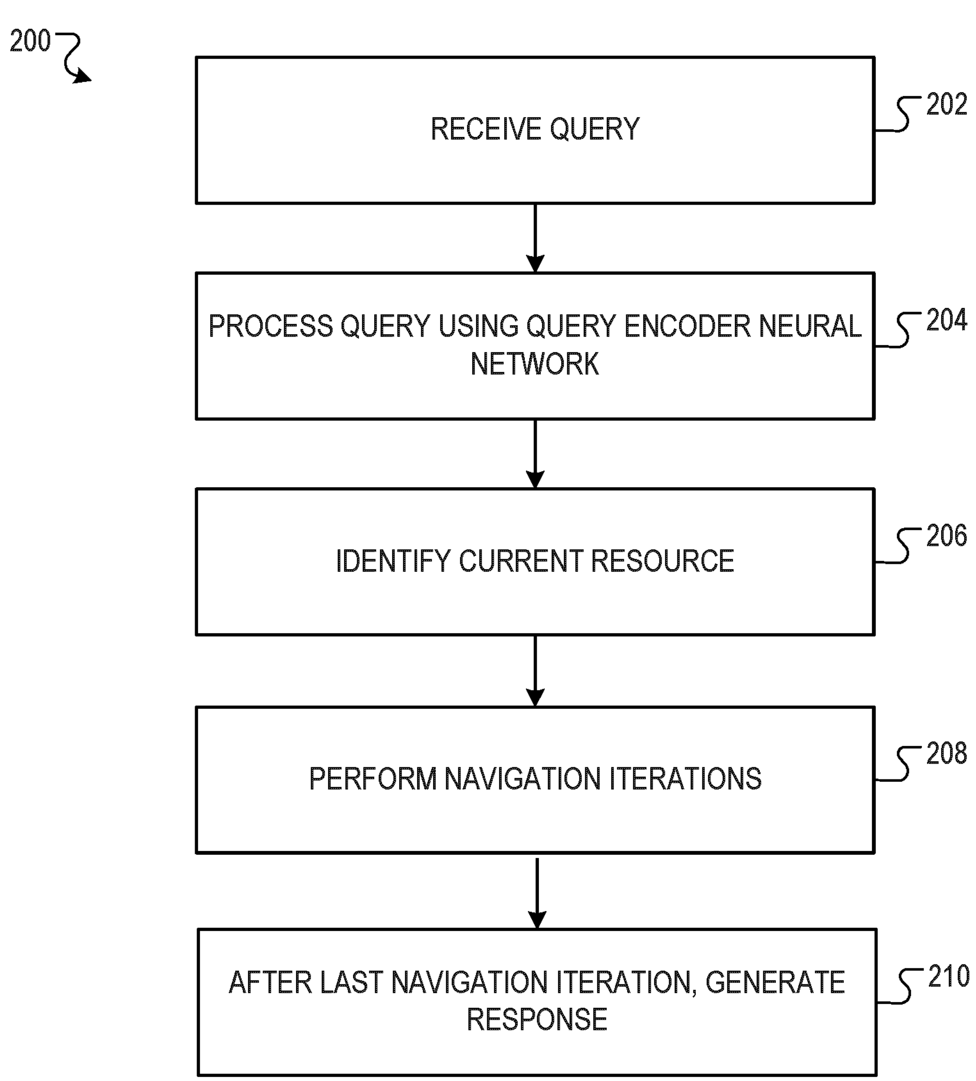
FIG. 2 is a flow diagram of an example process for performing information retrieval.

FIG. 2 is a flow diagram of an example process 200 for generating a response to a received query. For convenience, the process 200 will be described as being performed by a system of one or more computers located in one or more locations. For example, a resource navigation system, e.g., the resource navigation system 100 of FIG. 1, appropriately programmed, can perform the process 200.

The system receives a query (step 202).

The system processes the query using a query encoder neural network to generate an embedding of the query (step 204).

The system identifies a current resource in the collection of resources (step 206).

For example, the current resource can be the home page of the collection of resources, e.g., a home page of a web site, or a randomly selected resource from the collection.

As another example, the system can use an information retrieval technique to identify a resource that is relevant to the query within the collection of resources. For example, the information retrieval technique can be a TF-IDF based technique or any other appropriate information retrieval technique.

The system then performs a plurality of navigation iterations to generate a response to the query (step 208).

At a high level, the system updates the current resource at each navigation iteration, i.e., "navigates" to another resource that is linked to by the current resource as of the navigation iteration.

Performing a navigation iteration will be described in more detail below with reference to FIG. 3.

After the last navigation iteration, the system generates a response that characterizes the current resource after the last navigation iteration (the "final resource" for the iteration of the process 200) (step 210).

In particular, after performing each navigation iteration, the system can determine whether termination criteria for generating the response have been satisfied. Once the termination criteria have been satisfied, the system determines that the navigation iteration is the last iteration and uses the current resource after the iteration to generate the response.

The system can determine that the termination criteria have been satisfied in any of a variety of ways.

For example, the system can determine that the termination criteria are satisfied when a threshold, i.e., a predetermined maximum number, of navigation iterations have been performed.

As another example, the system can determine that the termination criteria are satisfied when a similarity between the embedding of the query and an embedding of the current resource after the last navigation iteration satisfies a threshold. For example, after each navigation iteration, the system can compute a dot product between the two embeddings and determine that the navigation iteration should be the last iteration when the dot product is higher than a threshold value.

The system can then, e.g., provide the response to the client device from which the query was received.

In some implementations, the response characterizes only the current resource after the last navigation iteration, i.e., and not other current resources for preceding navigation iterations.

Generally, the response can include data that identifies the current resource after the last navigation iteration and, in some implementations, (i) content from the current resource after the last navigation iteration, (ii) a summary of the content from the current resource after the last navigation iteration, or (iii) both.

The format of the response will generally depend on the information retrieval task being performed by the system.

For example, when the query represents a fact, the response can include content extracted from the resource that the system has determined verifies the fact. For example, the system can process the query and multiple segments of text from the resource using a neural network, e.g., a neural network that has been trained to perform fact verification, to generate a respective score for each of the multiple segments and then provide the highest scoring segment of text as the extracted content.

As another example, when the query represents a question, the response can include content extracted from the resource that the system has determined answers the question. For example, the system can process the query and multiple segments of text from the resource using a neural network, e.g., a neural network that has been trained to perform question answering, to generate a respective score for each of the multiple segments and then provide the highest scoring segment of text as the extracted content.

As another example, for a general search engine querying task, the system can generate a search result that identifies the resource, includes a link to the resource, and, optionally, includes a snippet of content from the resource and provide the search result in response to the query.

In some implementations, the system can perform multiple iterations of the process 200 for each received query.

That is, the system can identify multiple current resources for each received query and perform a respective iteration of the process 200 for each of the identified current resources. The response generated by the system can then characterize multiple different ones of the "final" resources identified by the different iterations of the process 200, i.e., multiple different ones of the final current resources identified after the last navigation iteration, or only the most relevant extracted content across all of the final resources.

In other words, the system can perform the above-described iteration of the process 200. The system can also identify one or more other current resources and perform navigation iterations as described above to determine one or more additional final resources.

The response can then also characterize some or all of the additional final resources in addition to the "final resource" identified above or can characterize only the most relevant final resource or can characterize only the most relevant extracted content across all of the final resources.

Figure 3:
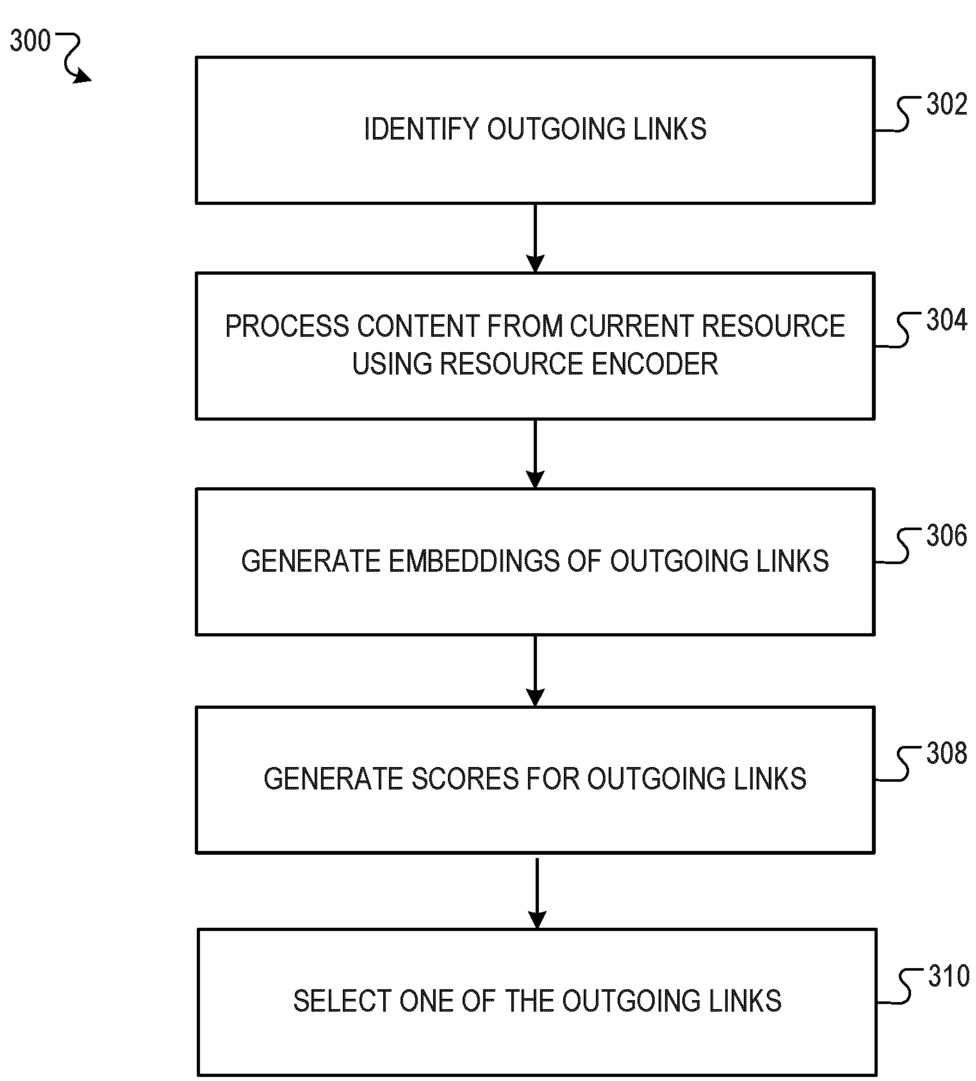
FIG. 3 is a flow diagram of an example process for performing a navigation iteration.

FIG. 3 is a flow diagram of an example process 300 for performing a navigation iteration. For convenience, the process 300 will be described as being performed by a system of one or more computers located in one or more locations. For example, a resource navigation system, e.g., the resource navigation system 100 of FIG. 1, appropriately programmed, can perform the process 300.

The system identifies a plurality of outgoing links from the current resource as of the navigation iteration (step 302). Each outgoing link is a link to a respective other resource in the collection of resources from the current resource.

In some cases, when the collection of resources is one or more web sites, each resource represents a different web page. In these cases, each outgoing link is a hyperlink to a different web page from the current web page.

In some other cases, the system can divide certain web pages into multiple resources. For example, the system can divide each web page that includes more than a threshold amount of text tokens into multiple resources that each include less than the threshold amount of text tokens. In these cases, the outgoing links can include hyperlinks to other web pages as well as links to other portions of the same web page. For example, for a given portion of a given web page, the links can include any other web pages that are linked to by any hyperlinks within the given portion as well as to the resources representing the adjacent portion(s) of the given web page.

The system processes content from the current resource using a resource encoder neural network to generate an embedding of the current resource (step 304).

As a particular example, the system can process the text from the current resource (and optionally the title of the current web page) using a text encoder, e.g., a Transformer neural network. As another example, the system can process both the text and the images from the current resource (and optionally the title of the current web page) using a multi-modal encoder, e.g., a multi-modal Transformer or other multi-modal representation generation neural network.

The system generates a respective embedding of each outgoing link (step 306).

For example, the system can generate the embedding of a given outgoing link from the content of the resource linked to by the outgoing link or from the text on the current resource that corresponds to the link, i.e., from the text of the hyperlink, or from both.

As a particular example, the system can process the content of the resource linked to by the outgoing link and, optionally, the text from the current resource that corresponds to the link, using the resource encoder neural network to generate the embedding of the given outgoing link.

As another particular example, the system can generate, using the resource encoder neural network, a respective token embedding for each text token in the current resource. The system can then generate the embedding of the resource linked to by the outgoing link from the token embeddings for the tokens in the text on the current resource that corresponds to the link, e.g., by computing a mean or other pooling operation on these token embeddings and, optionally, applying a non-linear activation function of the resulting pooled embedding.

In some implementations, the system also uses additional information characterizing the link to generate the embedding, e.g., by including the additional information in any of the inputs to the resource encoder neural network described above.

For example, the additional information can include a first indicator that indicates whether the respective other resource has already been selected as the current resource at a previous navigation iteration, a second indicator that indicates whether the respective other resource is another portion of a same web page as the current resource or is a different web page from the current resource, or both.

The system generates, using the navigation policy neural network, a respective score for each outgoing link from at least the embedding of the outgoing link, the embedding of the current resource, and the embedding of the query (step 308).

For example, the system can process a navigation input that includes the embedding of the current resource and the embedding of the query using one or more neural network layers of the navigation policy neural network, e.g., using a multi-layer perceptron to generate a combined embedding. In some cases, to provide additional context, the navigation input can also include respective embeddings of the current resources as of any preceding navigation iterations.

For each outgoing link, the system can then determine the respective score for the outgoing link based on a similarity between the combined embedding and the embedding of the outgoing link. For example, the system can compute a dot product or a cosine similarity between the combined embedding and the embedding of the outgoing link. As another example, the system can process the combined embedding and the embedding of the outgoing link using one or more additional layers of the neural network that output the similarity score.

The system then selects one of the outgoing links based on the respective scores for the outgoing links and updates the current resource to be the respective other resource linked to by the outgoing link (step 310).

As one example, the system can select the outgoing link having a highest respective score.

As another example, the system can generate, from the respective scores, a probability distribution that includes a respective probability for each outgoing link, e.g., by applying a softmax to the respective scores, and sample an outgoing link from the probability distribution.

After the last navigation interaction, the system generates a response that characterizes the current resource after the last navigation iteration.

Figure 4:
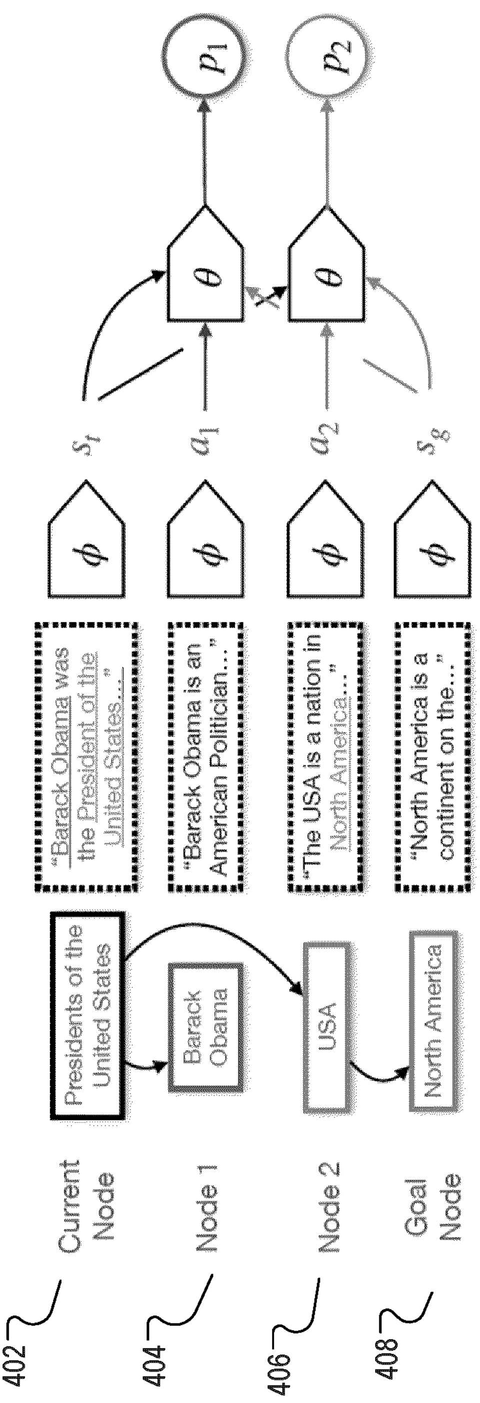
FIG. 4 shows the operation of the system at a navigation iteration.

FIG. 4 shows the operation of the system 100 when performing a navigation iteration.

As shown in FIG. 4, a current resource ("node") 402 for the navigation iteration includes a link to first resource ("node 1") 404 and a second resource ("node 2") 406. The goal of the navigation iterations is to obtain information available from a goal resource ("goal node") 408 that is linked to by the second resource 406 but not by the first resource 404. For example, the goal resource 408 may contain an answer to the query or may contain a statement that verifies a fact posed by the query.

To perform the navigation iteration, the system processes respective content 410 ("node text") of the current resource 402, the first resource 404, and the second resource 406 to generate an embedding $s_t$ of the current resource 402, an embedding $a_1$ of the first resource 404, and an embedding $a_2$ of the second resource 406.

In the example of FIG. 4, because the goal resource 408 is known, the system processes content of the goal resource 408 to generate an embedding $s_g$ of the goal resource 408. When the goal resource 408 is known, the system can process the content of the goal resource 408 using the resource encoder neural network to generate the embedding. As described above, at inference time, because the goal resource 408 is generally not known a priori, the system generally uses an embedding of the query in place of the embedding of the goal resource 408.

The system then generates a score $p_1$ for the first resource 404, and a score $p_2$ for the second resource 406 and uses the scores to select one of the first and second resources to navigate to at the navigation iteration.

For example, to generate the score for the first resource 404, the system can process $s_t$, $a_1$, and $s_g$. To generate the score for the second resource 406, the system can process $s_t$, $a_2$, and $s_g$.

Thus, because the scores are generated using embeddings that represent the content of not only the first and second resources but also the current resource and the goal resource (or, as a proxy, the query), the system can effectively navigate between resources to perform the information retrieval task.

The system 100 or another training system can train the various neural networks that are used for navigation in any of a variety of ways.

In some implementations, the system trains all of the neural network components described above jointly on training data for the information retrieval task that the system is configured to perform. For example, the system can train the neural networks through reinforcement learning, where the system receives a reward of one for successfully completing the task (as indicated in the training data) at a given navigation iteration and a reward of zero for not completing the task. As another example, the system can obtain training data that includes trajectories that successfully perform the information retrieval task and then train the neural networks on the trajectories through imitation learning, e.g., using a behavior cloning (BC) or other imitation learning objective.

In some other implementations, the system pre-trains some or all of the components on a graph navigation task.

For example, the system can pre-train the navigation policy neural network and, optionally, the resource encoder neural network on a graph navigation task, e.g., a task where the goal resource is known in advance.

In these cases, the system can use embeddings of the goal resource or of embedding of a portion of the content in the goal resource in place of embeddings of the query as shown above with reference to FIG. 4. For example, the system can generate these embeddings using the resource encoder neural network.

When the resource encoder neural network is not pre-trained jointly with the navigation policy neural network, the system can keep the parameters of the resource encoder neural network frozen to values learned through an unsupervised or semi-supervised representation learning objective.

In particular, the system can perform multiple instances of the graph navigation task on a collection of resources to generate a set of trajectories for the graph navigation task. The system can then pre-train the neural networks on the set of trajectories, e.g., through imitation learning or reinforcement learning as described above.

The system can use any of a variety of graph navigation tasks for the pre-training.

As one example, the system can generate the trajectories for the graph navigation task by randomly selecting a starting node (resource) in a training collection of resources and then performing a T-step random walk starting from the starting node, with the end node of the random walk being the goal resource. The system can either keep T fixed to a predetermined number throughout the pretraining or sample a value of T from a distribution for each trajectory. When training on this task, the system can either provide the entire content of the end node of the random walk or a snippet, e.g., a sentence or other text segment, from the end node as the content from the goal resource to be embedded (e.g., using the resource encoder neural network). This has an advantage of being simple, i.e. memory and compute-efficient, but (surprisingly) suffices to train an effective navigation policy, e.g. using behavioral cloning.

The system can then perform fine-tuning on the training data for the information retrieval task. For example, the system can train the query encoder neural network and, optionally, fine-tune the navigation policy neural network, the resource encoder neural network, or both on the training data for the information retrieval task using either reinforcement learning or imitation learning as described above.

The table below shows the success rate (%) for navigating a graph to a target with varying numbers of navigation steps required to reach the target. The table compares implementations of the described approach, Random Forward Behavioral Cloning (RFBC) and RFBC+RL (Reinforcement Learning), with various other approaches, in particular a greedy policy that selects an action with the smallest cosine distance with the target, and two types of Depth First Search (DFS). The described techniques perform much better than the others.

| | Navigation | | | |
|---|---|---|---|---|
| Method | 5 | 10 | 20 | multistep |
| RFBC | 85.3 | 76.4 | 67.5 | 77.4 |
| RFBC + RL | 85.1 | 77.6 | 68.1 | 78.3 |
| Greedy | 19.7 | 16.7 | 21.7 | 23.4 |
| Random DFS | 10.0 | 9.5 | 8.3 | 10.0 |
| Greedy DFS | 31.1 | 23.8 | 22.7 | 51.8 |

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving a query;

processing the query using a query encoder neural network to generate an embedding of the query;

identifying a current resource in a collection of resources; and generating a response to the query, comprising:

at each of a plurality of navigation iterations:

identifying a plurality of outgoing links from the current resource as of the navigation iteration, each outgoing link being a link to a respective other resource in the collection of resources from the current resource;

processing content from the current resource using a resource encoder neural network to generate an embedding of the current resource;

generating a respective embedding of each outgoing link;

generating, using a navigation policy neural network, a respective score for each outgoing link from at least the embedding of the outgoing link, the embedding of the current resource, and the embedding of the query;

selecting one of the outgoing links based on the respective scores for the outgoing links; and updating the current resource to be the respective other resource linked to by the outgoing link; and after a last navigation interaction, generating a response that characterizes the current resource after the last navigation iteration.

2. The method of claim 1, wherein the collection of resources comprises one or more web sites, and wherein each resource in the collection represents at least a portion of a web page in the one or more web sites.

3. The method of claim 2, wherein, for at least one of the navigation iterations, the current resource as of the navigation iteration represents a portion of a particular web page, and the plurality of outgoing links from the current resource as of the navigation iteration include (i) a respective link to each of one or more other portions of the particular web pages and (ii) one or more hyperlinks to other web pages in the collection.

4. The method of claim 2, wherein the query is submitted through an Internet search engine and wherein (i) the one or more web sites have not been indexed by the Internet search engine or (ii) content of one or more of the web pages in the one or more web sites has changed since the one or more web sites have been indexed by the Internet search engine.

5. The method of claim 2, wherein the one or more web sites are inaccessible to a search engine crawler.

6. The method of claim 1, wherein the query is received from a client device and wherein the method further comprises:

providing, to the client device, the response to the query.

7. The method of claim 1, wherein the response to the query includes a link to the current resource after the last navigation iteration.

8. The method of claim 1, wherein the response to the query includes (i) content from the current resource after the last navigation iteration, (ii) a summary of the content from the current resource after the last navigation iteration, or (iii) both.

9. The method of claim 1, wherein the resource encoder neural network comprises a self-attention neural network that is configured to process text tokens from the resource to generate a respective token embedding of each of the text tokens.

10. The method of claim 1, wherein selecting one of the outgoing links based on the respective scores for the outgoing links comprises:

selecting an outgoing link having a highest respective score or generating, from the respective scores, a probability distribution that includes a respective probability for each outgoing link and sampling an outgoing link from the probability distribution.

11. The method of claim 1, further comprising:

after performing the last navigation iteration, determining that termination criteria for generating the response have been satisfied.

12. The method of claim 11, wherein determining that termination criteria have been satisfied comprises:

determining that a threshold number of navigation iterations have been performed.

13. The method of claim 11, wherein determining that termination criteria have been satisfied comprises:

determining that a similarity between the embedding of the query and the embedding of the current resource after the last navigation iteration satisfies a threshold.

14. The method of claim 1, wherein generating, using a navigation policy neural network, a respective score for each outgoing link from at least the embedding of the outgoing link, the embedding of the current resource, and the embedding of the query comprises:

processing a navigation input comprising the embedding of the current resource and the embedding of the query using one or more neural network layers to generate a combined embedding; and for each outgoing link, determining the respective score for the outgoing link based on a similarity between the combined embedding and the embedding of the outgoing link.

15. The method of claim 14, wherein the navigation input further comprises respective embeddings of the current resources as of any preceding navigation iterations.

16. The method of claim 1, wherein generating a respective embedding of each outgoing link comprises:

generating the respective embedding from at least (i) content of the respective other resource linked to by the outgoing link, (ii) text in the current resource corresponding to the outgoing link, or (iii) both.

17. The method of claim 16, wherein, generating the respective embedding from at least (i) content of the respective other resource linked to by the outgoing link, (ii) text in the current resource corresponding to the outgoing link, or (iii) both comprises:

generating the respective embedding from at least (i) content of the respective other resource linked to by the outgoing link, (ii) text in the current resource corresponding to the outgoing link, or (iii) both, and (iv) one or more of:

a first indicator that indicates whether the respective other resource has already been selected as the current resource at a previous navigation iteration, or a second indicator that indicates whether the respective other resource is another portion of a same web page as the current resource or is a different web page from the current resource.

18. The method of claim 16, wherein generating the respective embedding from at least (i) content of the respective other resource linked to by the outgoing link, (ii) text in the current resource corresponding to the outgoing link, or (iii) both comprises:

processing (i) the content of the respective other resource linked to by the outgoing link (ii) the text in the current resource corresponding to the outgoing link, or (iii) both using the resource encoder neural network.

19. The method of claim 1, wherein identifying a current resource in a collection of resources comprises:

identifying the current resource by applying an information retrieval technique to identify a resource in the collection that is relevant to the query.

20. The method of claim 1, further comprising:

identifying one or more other resources in the collection of resources; and for each identified other resource, performing navigation iterations to identify a respective final other current resource, wherein the response characterizes one or more of the respective final other current resources for the identified other resources.

21. A system comprising:

one or more processors; and one or more storage devices storing instructions that, when executed by the one or more processors, cause the one or more processors to perform operations comprising:

receiving a query;

processing the query using a query encoder neural network to generate an embedding of the query;

identifying a current resource in a collection of resources; and generating a response to the query, comprising:

at each of a plurality of navigation iterations:

identifying a plurality of outgoing links from the current resource as of the navigation iteration, each outgoing link being a link to a respective other resource in the collection of resources from the current resource;

processing content from the current resource using a resource encoder neural network to generate an embedding of the current resource;

generating a respective embedding of each outgoing link;

generating, using a navigation policy neural network, a respective score for each outgoing link from at least the embedding of the outgoing link, the embedding of the current resource, and the embedding of the query;

selecting one of the outgoing links based on the respective scores for the outgoing links; and updating the current resource to be the respective other resource linked to by the outgoing link; and after a last navigation interaction, generating a response that characterizes the current resource after the last navigation iteration.

22. One or more non-transitory computer-readable storage media storing instructions that when executed by one or more computers cause the one or more computers to perform operations comprising:

receiving a query;

processing the query using a query encoder neural network to generate an embedding of the query;

identifying a current resource in a collection of resources; and generating a response to the query, comprising:

at each of a plurality of navigation iterations:

identifying a plurality of outgoing links from the current resource as of the navigation iteration, each outgoing link being a link to a respective other resource in the collection of resources from the current resource;

processing content from the current resource using a resource encoder neural network to generate an embedding of the current resource;

generating a respective embedding of each outgoing link;

generating, using a navigation policy neural network, a respective score for each outgoing link from at least the embedding of the outgoing link, the embedding of the current resource, and the embedding of the query;

selecting one of the outgoing links based on the respective scores for the outgoing links; and updating the current resource to be the respective other resource linked to by the outgoing link; and after a last navigation interaction, generating a response that characterizes the current resource after the last navigation iteration.

* * * * *